United States Patent [19]

Scharbrough et al.

[11] 3,743,475
[45] July 3, 1973

[54] CENTRAL SHAFT FEEDING FOR ROTARY HEARTH FURNACE

[75] Inventors: James A. Scharbrough, Allison Park; Charles R. Wilt, Jr., Pittsburgh; William E. Solano, Monroeville, all of Pa.

[73] Assignee: Salem Corporation, Pittsburgh, Pa.

[22] Filed: May 20, 1971

[21] Appl. No.: 145,437

[52] U.S. Cl. .................... 432/16, 423/177, 432/79, 432/98, 432/101
[51] Int. Cl. .......................................... F27b 19/00
[58] Field of Search .................... 263/27; 34/64, 65

[56] References Cited
UNITED STATES PATENTS
1,747,740  2/1930  Smith ................................. 263/27

FOREIGN PATENTS OR APPLICATIONS
65,929  5/1967  Australia .................................... 27/

Primary Examiner—John J. Camby
Attorney—Frank P. Cyr

[57] ABSTRACT

A method and apparatus for the thermal decomposition of limestone or other mineral substance wherein the apparatus employed for carrying out the method combines a vertical shaft for the feed therethrough of the materials to be treated and a rotary hearth positioned therebeneath. The rotary hearth is contained within a substantially airtight enclosure and receives the downward flow of the materials from the central shaft and further processes the same to produce the desired resultant product.

12 Claims, 2 Drawing Figures

PATENTED JUL 3 1973

INVENTORS
JAMES A. SCHARBROUGH
CHARLES R. WILT, JR. &
WILLIAM A. SOLANO

BY Frank P Cyr

ATTORNEY

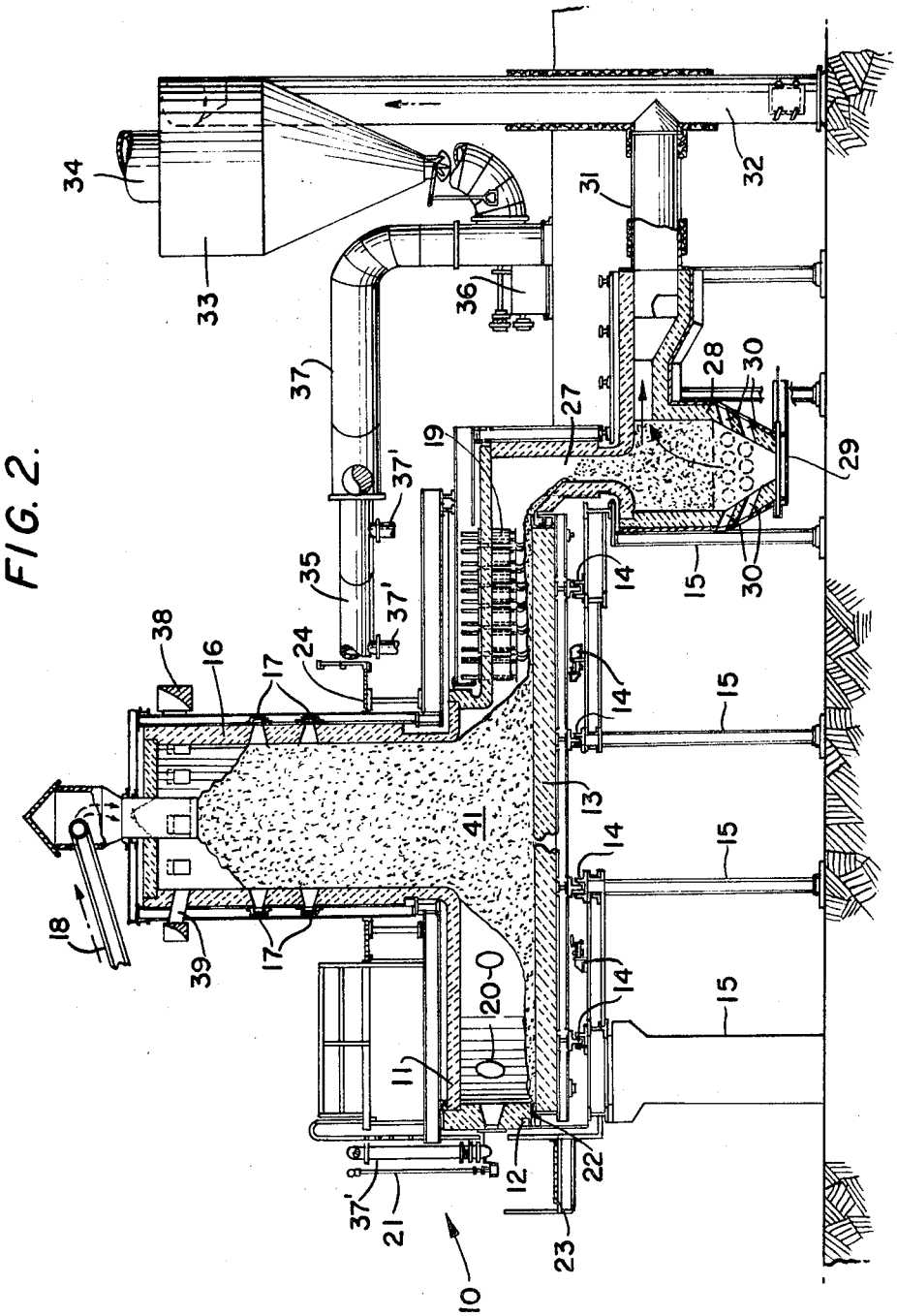

CENTRAL SHAFT FEEDING FOR ROTARY HEARTH FURNACE

BACKGROUND OF THE INVENTION

A conventional method for the calcination of limestone involves the use of a shaft furnace comprising a vertically extending column within which limestone is admitted. Fuel and air are forced up through this column and as the hot gases rise within the column, the heated gases drive $CO_2$ out of the limestone reducing it to calcium oxide. With this type of apparatus the resultant product is frequently over or underburned lime, which product is undesirable.

Likewise, tubularly-shaped steel kilns usually lined with a suitable refractory mounted on rollers have been employed. Usually these kilns comprise an elongated chamber which is tipped slightly from the horizontal with the high end of the kiln being provided with means for introducing materials therein and provided at the lower end thereof with some type of heat exchange means, usually a gaseous or oil fired burner which directs a flame stream over and in counterflow relation to the materials undergoing treatment within the heated chamber. In this type of furnace, the materials undergoing treatment are caused to tumble due to rotation of the kiln and to thus expose the material to the heat generated by the flame stream which is usually positioned at the exit end of the kiln. There are several drawbacks in the employment of this type of kiln in the calcination or thermal decomposition of limestone or other like materials. First, one must rely largely on the tumbling of the materials undergoing treatment within the rotating kiln to expose the materials to the flame stream directed thereover. Also, the fuel costs for operating a furnace of this type are excessive and also, the gases emanating from such a furnace are heavily laden with pollutants which are usually let out into the atmosphere.

Rotary hearth furnaces have been employed in the calcination or thermal decomposition of limestone. However, such rotating hearth furnaces have not been associated with a centrally located vertically extending shaft through which materials to undergo treatment are fed and caused to descend downwardly therethrough and to be ultimately deposited on the surface of the rotary hearth where the same are rabbled such as by vertically extending rabble arms or by other suitable means for turning the material over, such as by a screw mechanism or the like, so as to insure a completely calcined product.

With the above in mind it is the primary object of this invention to provide a furnace combining a rotary hearth with a vertically extending centrally located shaft employed for feeding materials to the rotary hearth and to rabble such materials deposited thereon to expose all areas of the same to heat which is directed within the rotary hearth enclosure so as to properly calcine or thermally decompose the materials undergoing treatment.

Another object of this invention is to provide a rotary hearth furnace with a centrally located vertically extending shaft for the feed of materials to the hearth in a continuous manner and to provide a suitable discharge mechanism extending across the floor of the hearth to effect a continuous removal of the processed materials from within the furnace and to direct the same outwardly to a suitable collection chamber.

Another object of the invention is to mount a rotary hearth surface within a substantially airtight enclosure so that substantially all of the hot gases emanating from within the enclosure will be caused to travel upwardly through the downwardly travelling materials which are continuously being fed to the vertically extending centrally located shaft to thus preheat the same and to likewise partially calcine the downwardly moving material.

Another object of the invention is to so regulate the amount of withdrawal of materials from the surface of the hearth so that at all times the centrally located shaft for the feed of materials is substantially filled with materials which are progressively being fed downwardly countercurrent to the upwardly flowing gases so as to preheat and partially calcine the downwardly travelling materials.

Another object of the invention is to utilize the air employed to cool the processed materials by directing the same to a manifold which will distribute the air to suitable burner structures mounted in the wall or roof of the furnace.

Another object of the invention is to so regulate the discharge of processed materials from within the cooling chamber as to always maintain a charge of processed materials in the outlet leading from the rotary hearth to the cooling chamber to thus minimize the escape of hot gases through the outlet leading to the cooling chamber for the processed materials.

Another object of the invention is to provide a structure wherein provision is made for an absolute control of the temperature generated within the furnace so as to prevent the over or under-burning of the materials to thus attain a resultant product of desired quality.

These and other objects of the invention will be apparent from the following detailed description and the accompanying drawings forming a part thereof.

DESCRIPTION OF THE DRAWINGS

FIG. 2 is a section taken on line 2—2 of FIG. 1, looking in the direction of the arrows.

DESCRIPTION OF THE PREFERRED EMBODIMENT

Figure 1:
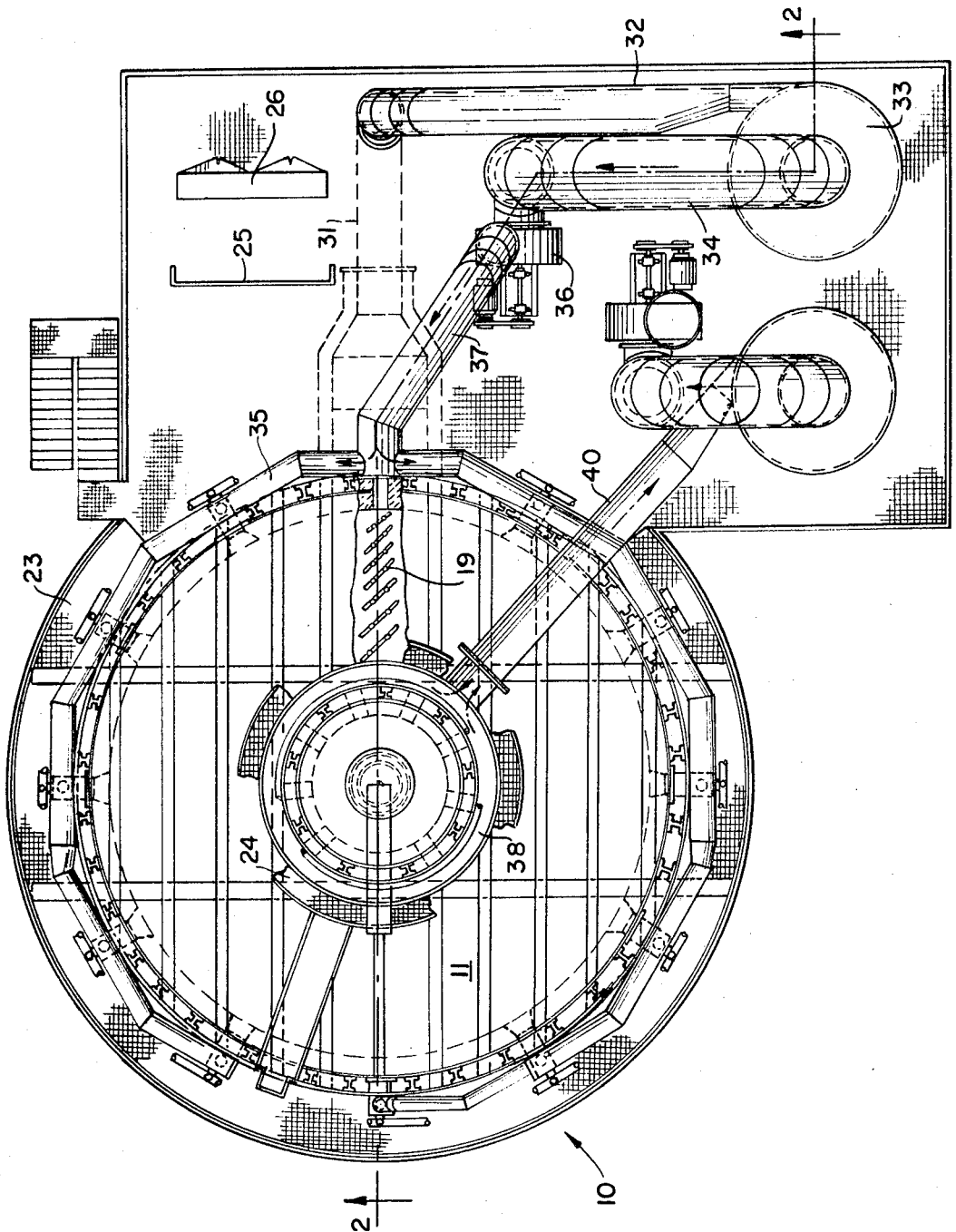
FIG. 1 is a top plan view with parts broken away disclosing an apparatus capable of carrying out the method of the present invention.

Referring now to the drawings, there is shown generally at 10 a rotary hearth furnace comprising a stationary roof 11 and side walls 12 both formed of a suitable refractory or like material to withstand the heat generated within the furnace during the processing of materials therein. A floor structure 13 also formed of a suitable refractory is mounted for rotation about a vertical axis and is thus supported by suitable roller structures 14 which are suitably journaled for rotation on a framework indicated generally at 15. The ensuing description of the invention will concern itself primarily with a method and apparatus adapted particularly for the calcination or thermal decomposition of limestone in the making of lime. However, it must be pointed out that the method and apparatus defined hereinafter can be as efficiently and economically employed to the calcination or burning or roasting of other mineral substances. As stated previously, the floor 13 is mounted for rotation on rollers 14 and any suitable means may be employed for imparting a rotary movement thereto and the speed of rotation of the floor may be easily regulated in any known manner.

Formed integral with or otherwise fixedly secured to the roof 11 is a vertically extending shaft 16 also formed of a suitable refractory material. If desired, holes 17 may be provided along the vertical wall to thus enable one to sample or otherwise determine the conditions of the materials feeding downwardly in the shaft. A suitable endless conveyor mechanism 18 is supported in any known manner and is adapted to deliver the charge of materials into the upper portion of the vertical shaft 16.

Mounted in the stationary roof 11 of the furnace 10 are a plurality of rabbles 19 which are adapted to engage the materials on the floor 13 and to thus cause a turnover of the materials in order to expose substantially all surfaces of the charge material to the heat which is created within the confines of the furnace by burners 20 which are shown as being placed in the side walls of the furnace although the burners could just as easily be placed in the roof 11 of the furnace. A suitable supply line 21 extends about the periphery of the side walls of the furnace and delivers the requisite fuel to all of the burners 20.

To provide a substantially airtight enclosure for the furnace structure a seal 22 of known construction, such as water or sand, is provided at the periphery of the rotating floor or hearth 13 and side walls 12. As is customary in furnaces of this type conventional walkways 23 and 24 are provided for use by the workmen manning the operation. To enable efficient operation of the furnace, a temperature control panel 25 and a motor control center 26, each associated with requisite sensing devices, can be employed for increasing the efficiency of operation of the furnace.

Mounted adjacent to the periphery of the rotating floor or hearth 13 is a processed material outlet 27 which leads to a cooling chamber 28. As can be appreciated, the outlet 27 and chamber 28 are formed of a suitable material, preferably refractories to withstand the heat to which these parts are exposed. A material outlet 29 is provided at the lower end of the chamber 28 and air admission openings 30 are formed in the walls of the chamber 28 for a purpose to be more fully described hereinafter. Extending from the cooling chamber 28 is a conduit 31 which leads to a vertically extending pipeway 32 which leads to a cyclone or like separator 33 of known construction. An air outlet 34 extends from the upper closed end of the cyclone separator and directs heated air to a manifold 35 by means of a blower 36 which is interposed between the outlet line 34 and a pipeline 37 which leads to the aforesaid manifold 35. Extending from the manifold 35 are a plurality of pipes 37' which feed this heated air to the burner structures 20.

Extending around the vertical shaft 16 at the upper end thereof is a waste gas collector indicated generally at 38. The collector 38 is in the nature of a manifold and connector pipes 39 extend from within the upper section of the vertical shaft and lead to the manifold. The waste gases emanating from the upper portion of the shaft 16 are directed outwardly therefrom by means of a conduit 40 which will direct such gases to a proper gas cleaning section and following the cleaning thereof released in the atmosphere. To prevent contamination of the surrounding atmosphere the waste gases can be processed in any known manner prior to their release to the atmosphere.

The above description of the apparatus shown in the accompanying drawings is merely illustrative of one type of apparatus which can be employed for carrying out the method of treating materials in accordance with the teachings of the present invention.

The method of treating materials in this furnace structure which combines a rotary hearth type furnace and a centrally located material feeding shaft will now be described.

Limestone or other mineral substance which is to undergo a thermal decomposition is fed to the central shaft 16 in the manner previously described. At the start of operation of the furnace, the rotating hearth is stationary and as the materials are fed into the shaft 16 the same will ultimately fill the shaft with some of the materials spreading outwardly on the hearth to assume somewhat the configuration of materials shown generally at 41 in FIG. 2 of the drawings. Following the filling of the shaft with the raw materials to undergo thermal decomposition and with some of the materials having spread outwardly from the center of the hearth as shown in FIG. 2 of the drawings, the hearth is set in motion to rotate about its axis and, of course, the burners are turned on to direct flame streams within the substantially airtight enclosure.

It should be pointed out that initially as the materials to be processed are added to the shaft 16 and fall onto the stationary refractory hearth 13, the materials will pile and assume an angle of repose resembling a conically shaped pile having a top diameter approximately the same as the inside diameter of the shaft. Now, with the hearth rotating, the materials on the hearth will move with the hearth and tend to spread thereon. As the materials spread on the hearth and rotate therewith they will come in contact with the aforesaid vertically disposed rabbles 19 or other equipment employed which will cause a rollover of the materials to expose previously unexposed areas of the materials to the heat emanating from the burners which are either mounted in the side walls or roof of the furnace. Also, as can be appreciated, the rabbles are so disposed as to not only rabble the materials on the hearth but to also direct them outwardly of the hearth to the cooling chamber which is located at the periphery of the hearth.

In some installations it may be more desirable to employ other means for directing the processed materials outwardly of the hearth. Such means could conceivably be a screw conveyor (not shown) extending across the floor area of the hearth and with such conveyor rotating it could be employed for the removal of the processed materials.

With the rotating hearth supplied with the materials, as aforesaid, and with the heat required to process the materials provided by the aforesaid burners and with the outlet for the processed materials filled as shown in FIG. 2 of the drawings, substantially all the gases emanating from within the chamber must now escape from within the substantially airtight chamber through the central shaft and in so doing not only preheating the incoming materials but can, if the temperature of the flue gases is sufficiently high, actually calcine the downwardly flowing materials, particularly those materials at the lower end of the vertical shaft. In order to insure the upward passage of the hot flue gases through the downwardly moving materials, a lower pressure is maintained in the waste gas collector than at the discharge outlet for the processed materials. This can easily be accomplished by arranging suitable valving arrangements in the waste gas conduit. Thus, it can be appreciated that with the outlet passage filled with already processed materials, the pressure at hearth level will be higher than that within the cooling chamber. However, the filled outlet passage will restrict the flow of hot gases therethrough with the result that such gases will be caused to flow upwardly through the incoming materials. Suitable monitoring means may be employed to effect the proper pressure differential between the waste gas collector and the outlet of the furnace to cause the hot flue gases to seek their exit from the furnace through the vertical stack and materials contained therein.

The blower aforesaid, which is positioned in the pipeline extending from the cyclone separator and the hot air manifold which supplies preheated air to the burners of the furnace will induce the incoming of cool air through the openings formed in the cooling chamber to which the processed materials are directed. As can be appreciated, the outside air employed for cooling the processed materials will be directed into the hot air manifold to return such hot air to the furnace to improve the process and to also lessen the costs for operating the furnace.

In order to permit the apparatus described previously to operate in its intended manner to process the materials in the manner contemplated by this invention, it is contemplated that the rate of feed of raw material to the shaft will be such as to cause a substantially complete filling of the shaft and likewise the rate of discharge of the processed materials from the cooling chamber be such as to always leave a substantial portion of the processed materials in the outlet section leading to the cooling chamber.

The method of processing materials as set forth above can be as efficiently carried out by using an apparatus differing from the structure described above.

As stated previously, certain objections are apparent in using the normal shaft kiln as well as the horizontally inclined kiln and for that matter, a rotary hearth wherein the materials fed thereto are not fed through a centrally located vertical shaft. Shaft kilns are prone to produce over-burned or under-burned materials, both of which are undesirable, and this is caused primarily by reason of the fact that in a shaft kiln no provision is made for the accurate temperature control with the kiln. In rotary kilns the rabbling of the materials therein is dependent almost entirely on the tumbling action of the materials taking place during rotation of the kiln. In the case of the rotary hearth furnace, such rabbles have not been employed in the past with a centrally located vertically extending shaft for feeding materials thereto. Thus, the invention herein combines the beneficial effects of both a vertical kiln and a rotary hearth to properly process materials. Also, it employs the beneficial effect of a rabbled rotary hearth within a substantially airtight enclosure to permit for the hot gases within the enclosure to escape from therein through the vertically extending feed shaft so as to not only preheat the materials flowing downwardly therethrough but to actually calcine some of the materials, particularly those materials which are at the bottom section of the vertical shaft.

The feeding of the materials to undergo calcination or thermal decomposition through the centrally located feeding shaft which is normally kept in a substantially filled condition, depositing such materials centrally of a rotating hearth with rabbles mounted in the roof of the furnace to cause turnover of the materials on the hearth coupled with the pressure differentials maintained between the incoming materials inlet and the processed materials outlet to cause the hot flue gases to escape upwardly through the downwardly flowing materials forms the crux of the present invention.

As can be appreciated, the method and apparatus described above will materially reduce the cost for the fuels employed for properly processing the materials in the manner described hereabove.

Also, it can be seen that with a positive means for regulating the temperature within the furnace, there is avoided the over and/or under-burning of the materials within the furnace, both conditions being undesirable for the finished product.

Also, while we have shown but one outlet for the reception of the processed materials, it is obvious that additional outlets may be provided along the periphery of the rotating hearth so as to speed up the operation of the apparatus in instances where the materials undergoing processing are capable of being processed more rapidly.

We claim:

1. An apparatus for subjecting mineral substances to thermal decomposition comprising a rotary hearth mounted for rotation within the confines of a substantially airtight enclosure, a unitary, vertically extending feed column for the feed of materials to the said hearth, said materials in direct contact with the inner walls of the column, with said feed columns being positioned centrally of said hearth, said enclosure comprising a stationary roof and side walls with burner means mounted therein to direct a stream of hot gases within the enclosure and upwardly in direct contact with the mineral substances, rabbles mounted in said roof, said rabble means engaging with said materials on said hearth to effect a turnover thereof during its travel thereon, and a material outlet for the said materials.

2. The structure recited in claim 1 wherein a pressure differential is maintained between the outlet end of the enclosure and the feed end for the raw materials whereby the hot gases will exit through the said vertically extending shaft to heat the materials in said shaft.

3. The structure recited in claim 1 wherein said shaft is maintained substantially filled with materials to be processed on the rotary hearth.

4. The structure recited in claim 1 wherein air is admitted at the outlet end for cooling the said processed materials and then directed to the burner means to supply preheated air thereto.

5. The method of subjecting a mineral substance to a thermal decomposition consisting of feeding such materials downwardly through a unitary, vertically extending feed column which is centrally located over a horizontally extending rotary hearth mounted within a substantially airtight enclosure, directing streams of hot gases within the enclosure and causing said hot gases to exit from within the enclosure through said vertically extending column to heat the materials downwardly flowing towards the hearth through the column, by direct contact with the substance.

6. The method set forth in claim 5 wherein the enclosure is provided with an exit for the processed materials and wherein a pressure differential is maintained between the feed shaft and the exit of the enclosure to induce the hot gases to exit through the vertically extending shaft to heat process the materials flowing downwardly therethrough.

7. The method set forth in claim 5 wherein said rotary hearth is associated with a plurality of rabbles to cause a turnover of the materials undergoing treatment thereon.

8. The method set forth in claim 7 wherein the enclosure is provided with an exit for the processed materials and wherein a pressure differential is maintained between the feed shaft and the exit of the enclosure to induce the hot gases to exit through the vertically extending shaft to heat process the materials flowing downwardly therethrough.

9. The method set forth in claim 8 wherein said rotary hearth is associated with a plurality of rabbles to cause a turnover of the materials undergoing treatment thereon.

10. The method set forth in claim 8 wherein air is admitted at the exit end for cooling the processed materials and such air is then directed to burners mounted in the walls of the enclosure.

11. The method set forth in claim 5 wherein air is admitted at the exit end for cooling the processed materials and such air is then directed to burners mounted in the walls of the enclosure.

12. The method of subjecting mineral substances to thermal decomposition consisting in feeding said substances to a unitary hollow column in such manner as to fill substantially the inner walls of the column, said column being positioned vertically over a horizontally extending rotary hearth in an air tight enclosure, directing streams of hot gases within the enclosure and causing said hot gases to exit from the enclosure upwardly through the column to directly contact and pre-heat the entire mass of the substances within the column.

* * * * *

UNITED STATES PATENT OFFICE
CERTIFICATE OF CORRECTION

Patent No. 3,743,475　　　　　　Dated July 3, 1973

Inventor(s) Scharbrough, James A.; Wilt, Charles R.; and Solano, William A.

It is certified that error appears in the above-identified patent and that said Letters Patent are hereby corrected as shown below:

Claim 1, line 6, before "said" add --some of-- and after "materials" add --being--.

Signed and sealed this 19th day of March 1974.

(SEAL)
Attest:

EDWARD M. FLETCHER, JR.
Attesting Officer

C. MARSHALL DANN
Commissioner of Patents